Oct. 18, 1927.

H. BECKER 1,645,574

VALVE GEAR FOR POWER ENGINES

Filed April 25, 1925

Inventor
Heinrich Becker

Patented Oct. 18, 1927.

1,645,574

UNITED STATES PATENT OFFICE.

HEINRICH BECKER, OF KIEL-HASSEE, GERMANY, ASSIGNOR TO FRIED. KRUPP GERMANIAWERFT AKTIENGESELLSCHAFT, OF KIEL-GAARDEN, GERMANY.

VALVE GEAR FOR POWER ENGINES.

Application filed April 25, 1925, Serial No. 25,767, and in Germany May 28, 1924.

The invention relates to those valves of power engines with which, as for instance with the starting valves of internal combustion engines, the opening of the valve is effected by compressed air, for instance by the starting air, this air acting upon a piston fastened on the valve stem. With known valves of the character stated the valve is kept closed by the cam roller of the valve lever rolling over a cylindrical portion of the cam disc, while the compressed air comes to act and opens the valve when the cam roller engages a cut-off portion (negative cam) of said disc.

The object of the invention is to combine, in as simple a manner as possible, a valve gear of the kind stated with an oil pressure gear comprising an active and a passive controlling piston and a liquid-column inserted between them. This object is attained according to the invention by the fact that the cylinder of the passive piston of the liquid gear is arranged in close connection to the cylinder of the compressed air piston, the lower end faces of said two pistons being situated at about the same level, and that below the two cylinders there is arranged a controlling lever of small mass which engages under the end faces of said two pistons.

Figure 2:
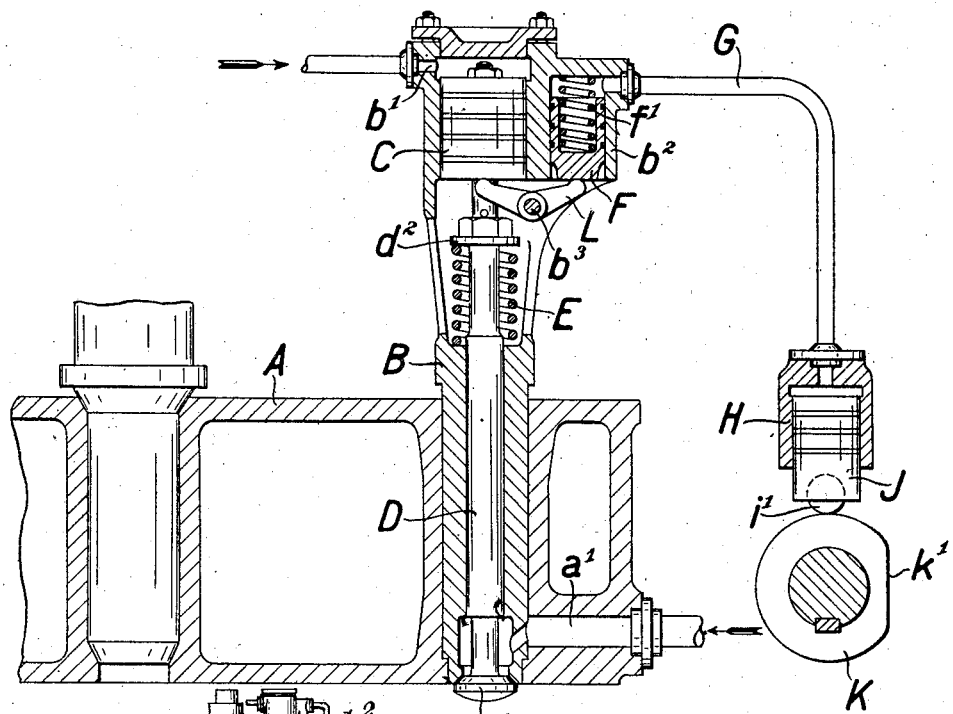
Figure 1:
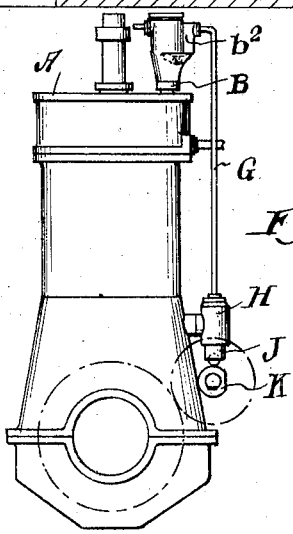

An embodiment of the invention is illustrated in the accompanying drawing by way of example, wherein Fig. 1 is a partial end view of an internal combustion engine showing the new valve gear, and Fig. 2 is a section through the valve gear and starting valve of the engine.

A denotes the portion concerned of the cylinder cover of an internal combustion engine in which cover are arranged the casing B of a compressed air starting valve and the supply conduit $a^1$ for the compressed air. A piston C fastened to the valve stem D is able to reciprocate in the upper cylindrical portion of the casing B. When the parts are in position of rest, the starting valve $d^1$ which opens towards the working cylinder of the machine, is kept closed by a spring E arranged in the casing B and abutting from below against a collar $d^2$ of the valve stem D. An admission pipe $b^1$ enables the starting air to enter the room above the piston C.

A cylinder $b^2$ is connected to the valve casing B at the level of the piston C in which cylinder the passive piston F is able to reciprocate, a coiled spring $f^1$ acting on this piston. A pipe G which is filled with pressure-liquid leads from the cylinder $b^2$ to a second cylinder H in which the active piston J may reciprocate. This piston J carries on its lower end a roller $i^1$ which cooperates with the cam disc K, $k^1$. Between the piston F and the piston C is arranged a short double-armed lever L adapted to rock about a shaft $b^3$ mounted in the casing B. The left-hand arm of this double lever L is forked and, embracing the valve stem D, it engages under the piston C, while the right-hand arm of the lever L engages under the piston F. The spring $f^1$ keeps the pistons C and F and the double lever L in contact with each other.

The described gear works as follows:

When in position of rest or in normal state of operation, the members of the gear take the position shown in the drawing. If now compressed air is supplied to the pipe $b^1$ to start or to reverse the machine, the piston C tends to move downward. It presses thereby against the left-hand arm of the lever L which transmits this pressure to the piston F and farther through the oil in the pipe G to the piston J so that the roller $i^1$ is brought into close contact with the periphery of the cam disc K. A downward movement of the piston C and therewith an opening of the valve $d^1$ however takes place only if the cam disc K has rotated so far that its cut-off portion $k^1$ passes under the roller $i^1$. The valve $d^1$ is thereby opened and is closed again by means of the oil pressure device and the springs E and $f^1$.

By arranging the passive controlling cylinder immediately beside the compressed starting air cylinder and at the same level, and by providing the small lever L engaging under the pistons C and F and having a little mass only, an extremely simple, light and compact combination of the fluid gear known per se and the valve operated by compressed air is attained.

Claims.

1. A fluid controlling gear for the valves of power engines in which the opening of the valve is effected by compressed air and controlled by a cam driven from the engine shaft, comprising a piston on the valve a cylinder for said piston, a second cylinder mounted beside the first cylinder, a second piston operating in said second cylinder, the lower ends of said pistons being at substantially the same height, a short lever having two arms each of which contacts the lower face of one of said pistons, and fluid means controlled by said cam for actuating said second piston.

2. A fluid controlling gear for the valves of power engines in accordance with claim 1 in which the fluid means for actuating the second piston comprises a cylinder, a piston in said cylinder engaging the cam, a tube connecting said cylinder to said second cylinder, and a non-compressible liquid filling said tube, and said cylinders.

The foregoing specification signed at Hamburg, Germany, this 1st day of April, 1925.

HEINRICH BECKER.